ual Patent [19] [11] 3,900,475

Vida et al. [45] Aug. 19, 1975

[54] CERTAIN PHENOBARBITAL SALTS

[75] Inventors: Julius A. Vida, Boston; Mary L. Hooker, Cambridge, both of Mass.

[73] Assignee: The Kendall Company, Walpole, Mass.

[22] Filed: June 26, 1972

[21] Appl. No.: 265,977

[52] U.S. Cl.... 260/256.4 C; 260/256.5 R; 260/258; 424/254
[51] Int. Cl.². ..................................... C07D 239/64
[58] Field of Search............. 260/256.4 C, 257, 258, 260/256.5 R

[56] References Cited
UNITED STATES PATENTS

| | | | |
|---|---|---|---|
| 2,776,283 | 1/1957 | Rorig | 260/256.4 C |
| 3,314,958 | 4/1967 | Wakeman et al. | 260/258 |
| 3,635,980 | 1/1972 | Vida et al. | 260/257 |
| 3,679,683 | 7/1972 | Gorbaty | 260/256.4 C |
| 3,761,478 | 9/1973 | Berger et al. | 260/256.4 C |

*Primary Examiner*—Richard J. Gallagher

[57] ABSTRACT

Salts of phenobarbital having the formula

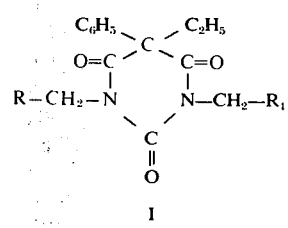

wherein R is $Y^+X^-$, Y being a 2-thiouronium or N-phenyl-2-thiouronium group or hexamethylenetetramine and X being bromine or chlorine, and $R_1$ is hydrogen or R are disclosed. These compounds have central nervous system depressant activity.

7 Claims, No Drawings

CERTAIN PHENOBARBITAL SALTS

This invention relates to selected salts and to therapeutic compositions containing same.

More specifically, this invention relates to compounds having the structural formula

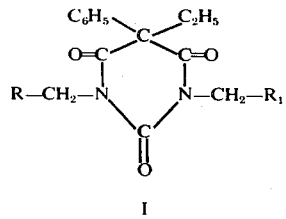

I wherein R is $Y^+X^-$, Y being a 2-thiouronium or N-phenyl-2-thiouronium group or hexamethylenetetramine and X being bromine or chlorine, and $R_1$ is hydrogen or R.

Recently a series of N,N'-bis-halomethyl phenobarbital compounds having utility as anticonvulsant agents have been discovered. These compounds are fully described in U.S. Pat. No. 3,635,980, which is hereby incorporated by reference in its entirety.

Now it has been found that selected salts can be prepared from the aforementioned bis-halomethyl compounds and corresponding methyl-halomethyl compounds, and that said salts have central nervous system depressant activity.

More in detail, salts having the formula I can be prepared by reacting N,N'-bis-bromomethyl phenobarbital, N,N'-bis-chloromethyl phenobarbital, 1-methyl-3-bromomethyl phenobarbital or 1-methyl-3-chloromethyl phenobarbital with thiourea, phenylthiourea or hexamethylenetetramine in the presence of an inert solvent. Suitable solvents include acetone, acetonitrile, dimethylformamide, dimethylacetamide, etc. The reaction can be carried out at any temperature from about room temperature up to the boiling point of the particular solvent employed in the reaction. The desired salts I are readily obtained in good yield and are isolated and purified by conventional techniques such as crystallization, extraction, distillation, filtration, preparative chromatography, etc.

The 1-methyl-3-halomethyl phenobarbitals used as reactants in preparing the compounds of this invention can be prepared by reacting 1-methyl-3-methoxymethyl phenobarbital, which is described in copending application, Ser. No. 259,252, filed June 2, 1972, with acetyl bromide or acetyl chloride in the presence of a Lewis Acid catalyst such as stannic bromide, stannic chloride, zonc chloride, aluminum chloride or boron trifluoride etherate. The reaction is carried out over a temperature range of from 10°C to 150°C, the methyl-halomethyl compound being isolated and purified by the aforementioned conventional techniques.

While any compound having the formula I can be readily prepared, preferred embodiments of this invention are directed to compounds I where X is bromine.

The compounds of this invention can be formulated for oral or parenteral administration according to conventional techniques. Effectiveness and toxicity of these compounds is such that each dosage unit can contain from 5 to 500 mg. of active material. Compositions for oral administration can be solid or liquid and can take the form of syrups, isotonic solutions, tablets, capsules etc. Suitable solid physiologically acceptable carriers include lactose, magnesium stearate, sucrose, talc, stearic acid, gelatin, polyvinyl pyrrolidone etc. Exemplary liquid physiologically acceptable carriers are peanut oil, olive oil, sesame oil and water. Furthermore, the carrier may include a time delay material such as glyceryl monostearate or glyceryl distearate, alone or in combination with a wax.

If a solid carrier is used, the preparation can be tabletted, placed in a hard gelatin capsule or in the form of a troche or lozenge. The amount of solid carrier will vary widely but preferably will be from about 25 mg. to about 1 g. If a liquid carrier is used, the preparation may be in the form of a soft gelatin capsule, placed in an ampule or in a liquid suspension.

For parenteral administration, the carrier or excipient may be a sterile, parenterally acceptable liquid; e.g., water or a parenterally acceptable oil; e.g., arachis oil contained in ampules.

While any of the above compositions are efficacious, preferred are tablets for oral administration.

As previously mentioned, these salts exhibit central nervous system depressant activity. Thus, for example, the salts prepared from thiourea exhibit analgetic, reserpine-like and anticonvulsant activity, the salts derived from phenylthiourea have analgetic activity and the salts derived from hexamethylenetetramine are useful as skeletal muscle relaxants.

In the following examples which will serve to illustrate the practice of this invention, all tests were conducted on adult albino male mice (Charles River strain); the dosage consisted of the active agent suspended in 10% aqueous acacia and was administered orally unless otherwise indicated.

Acute oral toxicity and acute intraperitoneal toxicity were determined in the conventional manner. The results were expressed as $LD_{50}$, the dose required to produce death in 50% of the animals treated, determined graphically.

Central nervous system depressant activity was determined using the method of Reinhard and Scudi, Proceedings of the Society for Experimental Biology and Medicine, Vol. 100, pp. 381–383 (1959), along with the prolongation of the effect of a hypnotic dose of hexobarbital according to the method of Reinhard, Proceedings of the Society for Experimental Biology and Medicine, Vol. 58, p. 210 (1945). Central nervous system depressant activity was also measured by the ability of the test compound to protect against the lethal effect of a toxic dose of strychnine sulfate. Observation (visual and touch) in the animals tested, of muscle flaccidity, without interference with spontaneous respiration after administration of the test compound, was also taken as an indication of central nervous system depressant activity.

Sedative or reserpine-like activity was discerned according to the method of Lim, Pharmacologic Techniques in Drug Evaluation, pp. 291–297 (1964) by visual observation of eyelid closure.

The tail flick test was utilized in determining analgetic activity. This test is based on the reaction of the animal to flick its tail when its tail is placed on a hot plate; the reaction time of the animal to the stimulus is noted before and after the test compound is given.

Anticonvulsant effectiveness against maximal electroshock was determined after administration of the test compound. Protection was indicated if the animal failed to show the tonic extensor component of the maximal electroshock seizure pattern in unprotected animals.

The results of the aforementioned tests were, in most instances, expressed as $ED_{50}$, the dose required to produce the desired effect in 50% of the animals tested.

EXAMPLE 1

N,N'-bis-bromomethyl phenobarbital was prepared by reacting N,N'-bis-methoxymethyl phenobarbital with acetyl bromide according to the process described in U.S. Pat. No. 3,635,980.

The amount of 4.2 g. of N,N'-bis-bromomethyl phenobarbital was dissolved in 30 ml. of acetone. To the solution was added a solution of 1.5 g. thiourea in 50 ml. of acetone. Upon mixing, a white solid precipitated from the reaction solution. After allowing the resulting mixture to stand at room temperature overnight, filtration provided a solid which was washed with acetone and dried at room temperature. Recrystallization of the solid from acetonitrile in a Soxhlet extractor provided 1,3-bis-(2-thiouronium-S-methyl)-phenobarbital dibromide, m.p. 230°–233°C.

Analysis. Calc'd for $C_{16}H_{22}O_3N_6S_2Br_2$: C, 33.69; H, 3.89; N, 14.74; S, 11.24; Br, 28.02
Found: C, 33.94; H, 3.81; N, 14.73; S, 11.40; Br, 28.11

When tested as described, the $ED_{50}$ was found to be 600 mg/kg against a lethal dose of strychnine sulfate indicating central nervous system depressant activity.

Also, when administered to 15 mice, a dosage of 100 mg/kg caused ptosis of the eyelids. The animals remained undisturbed, but showed exagerated motor activity when touched.

The $LD_{50}$ was determined to be greater than 500 mg/kg (no deaths out of 10 animals at this dosage) but less than 1000 mg/kg (7 out of 10 animals died at this dosage).

EXAMPLE 2

To a solution of N,N'-bis-bromomethyl phenobarbital (0.005 moles; 2.1 g.) in 30 ml. of warm acetone, was added a solution of phenylthiourea (0.01 mole; 1.5 g.) in 25 ml. of acetone. After standing in a closed flask overnight at room temperature, the reaction solution was decanted and the residual white solid washed with acetone, filtered and washed with ether, thereby providing 1,3-bis-(N-phenyl-2-thiouronium-S-methyl)-phenobarbital dibromide, m.p. 192°–198°C (dec).

Analysis. Calc'd for $C_{28}H_{30}N_6O_3S_2Br_2$: C, 46.54; H, 4.18; N, 11.63; O, 6.64; S, 8.87; Br, 22.12
Found: C, 46.43; H, 4.14; N, 11.60

When administered intraperitoneally to ten mice at a dosage of 500 mg/kg, analgetic activity was demonstrated according to the tail flick method; the $ED_{50}$ being less than 500 mg/kg. Also, a marked sedative effect was observed at this dosage. The $LD_{50}$ (i.p.) was found to be approximately 500 mg/kg.

EXAMPLE 3

Hexamethylenetetramine (0.0107 mole; 1.5 g.) was added to a solution of N,N'-bis-bromomethyl phenobarbital (0.005 mole; 2.1 g.) in 75 ml. dichloroethane. The reaction mixture was heated at 50°C overnight and filtered to separate a white solid from the solution. After washing with dichloroethane, the bis-(hexamethylenetetramine salt) of 1,3-bis-bromomethyl phenobarbital, m.p. 137°–140°C was obtained.

Analysis. Calc'd for $C_{26}H_{38}O_3N_{10}Br_2$: C, 44.71; H, 5.48; N, 20.05
Found: C, 44.69; H, 5.41; N, 19.86

Administration of the salt at a dosage of 1000 mg/kg (intraperitoneally) to 15 mice resulted in skeletal muscle flaccidity without death, indicating activity as a centrally active skeletal muscle relaxant.

EXAMPLE 4

Lithium hydride (0.50 mole; 3.97 g.) was added to an ice cooled, stirred solution of mephobarbital (0.50 mole; 123.1 g.) in 1250 ml. of dimethylformamide. After 90 minutes, chloromethyl methyl ether (0.55 mole; 44.2 g.) was added dropwise over a period of 30 minutes. The colorless solution was stirred in the cold for 2 hours and then poured into 2000 ml. of ice water. The solid precipitate was collected, washed with water and air-dried to yield 135.8 g. of crude product. Crystallization from 600 ml. of ethanol yielded 101.6 g. (70% of theory) of 1-methyl-3-methoxymethyl phenobarbital, m.p. 115°–116°C. Analysis. Calc'd for $C_{15}H_{18}O_4N_2$: C, 62.05; H, 6.25; N, 9.65 Found: C, 62.19; H, 6.09; N, 9.40

A suspension of 1-methyl-3-methoxymethyl phenobarbital (0.21 mole; 60.5 g.) in acetyl bromide (0.60 mole; 74 g.) was treated with 16 g. of stannic bromide and heated at 55°C, with stirring, for 7 days. The resulting suspension was poured into 1200 ml. of ice water and stirred for 4 hours. The solid was collected, washed with cold water and vacuum desiccated. Crystallization from hexane yielded 55.7 g. (79% of theory) of 1-methyl-3-bromomethyl phenobarbital, m.p. 121°–122°C.

Analysis. Calc'd for $C_{14}H_{15}O_3N_2Br$: C, 49.57; H, 4.46; N, 8.26; Br, 23.56
Found: C, 49.74; H, 4.09; N, 8.24; Br, 23.69

A solution of 1-methyl-3-bromomethyl phenobarbital (0.075 mole; 25.4 g.) in 150 ml. of acetonitrile was added to a warm (approximately 40°C) solution of thiourea (0.075 mole; 5.7 g.) in 300 ml. of acetonitrile. The resulting solution was refluxed for 3 hours, cooled and evaporated to a syrup at reduced pressure. The syrup was crystallized by being taken up in 250 ml. of hot ethanol, cooling slightly and adding 250 ml. of ethyl ether. The precipitate was collected, washed with ethanol/ethyl ether, 1:1 by volume, and with ethyl ether, air-dried and dried in vacuo to yield 27.2 g. (88% of theory) of 1-methyl-3-(2-thiouronium-S-methyl)-phenobarbital bromide, m.p. 214°–215°C.

Analysis. Calc'd for $C_{15}H_{19}N_4O_3SBr$: C, 43.39; H, 4.61; N, 13.49; Br, 19.24; S, 7.72
Found: C, 43.54; H, 4.65; N, 13.45; Br, 19.12; S, 7.61

When tested as described, this compound showed analgetic activity at a dosage of 250 mg/kg; the $ED_{50}$ being greater than 250 mg/kg. Activity as a central nervous system depressant was also observed using the hexobarbital methods; the $ED_{50}$ being approximately 250 mg/kg. This compound also exhibited anticonvulsant activity having an $ED_{50}$ of less than 250 mg/kg.

What is claimed is:

1. A compound having the structural formula

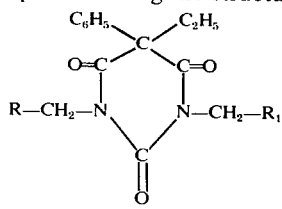

wherein R is $Y^+X^-$, Y being a 2-thiouronium or N-phenyl-2-thiouronium group or hexamethylenetetramine; X being bromine or chlorine, and $R_1$ is hydrogen or R.

2. The compound of claim 1 wherein $R_1$ is R and X is bromine.

3. The compound of claim 2 having the name 1,3-bis(2-thiouronium-S-methyl)-phenobarbital dibromide.

4. The compound of claim 2 having the name 1,3-bis-(N-phenyl-2-thiouronium-S-methyl)-phenobarbital dibromide.

5. The compound of claim 2 having the name bis-(hexamethylenetetramine salt) of 1,3-bis-bromomethyl phenobarbital.

6. The compound of claim 1 wherein $R_1$ is hydrogen and X is bromine.

7. The compound of claim 6 having the name 1-methyl-3-(2-thiouronium-S-methyl)-phenobarbital bromide.

* * * * *